July 31, 1956  J. F. JOY  2,756,979
SLACK EJECTOR MECHANISM FOR A COAL CUTTING MACHINE
Filed June 1, 1948  10 Sheets-Sheet 2
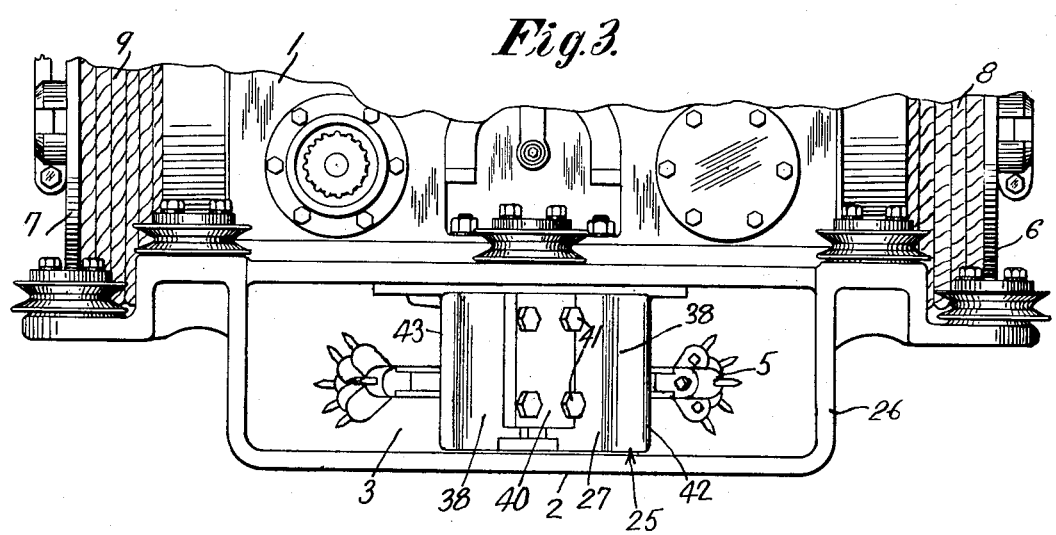
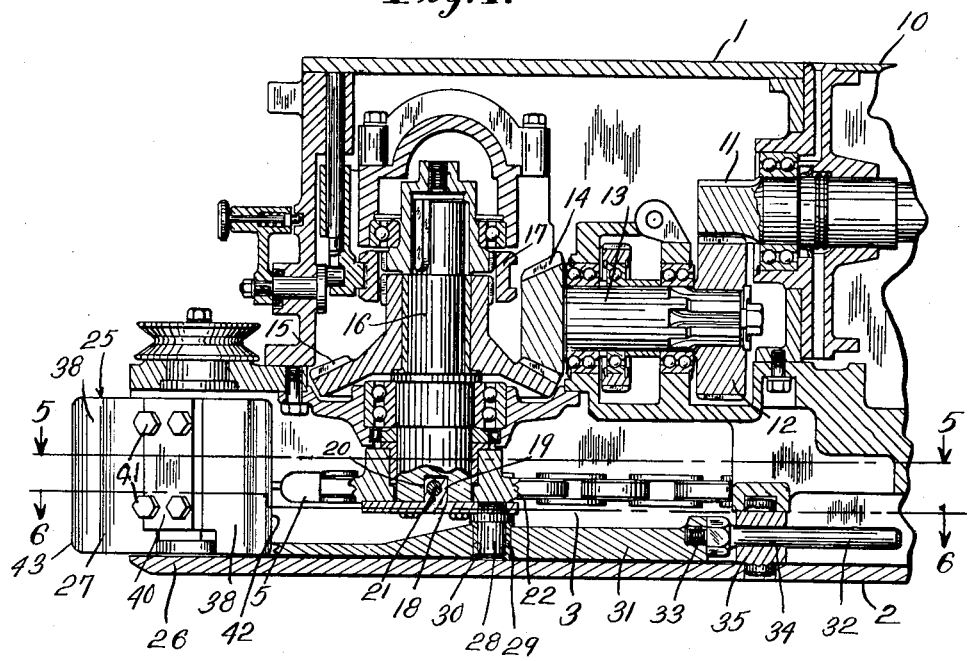
Inventor:
Joseph F. Joy.
by Charles F. Osgood,
Attorney.

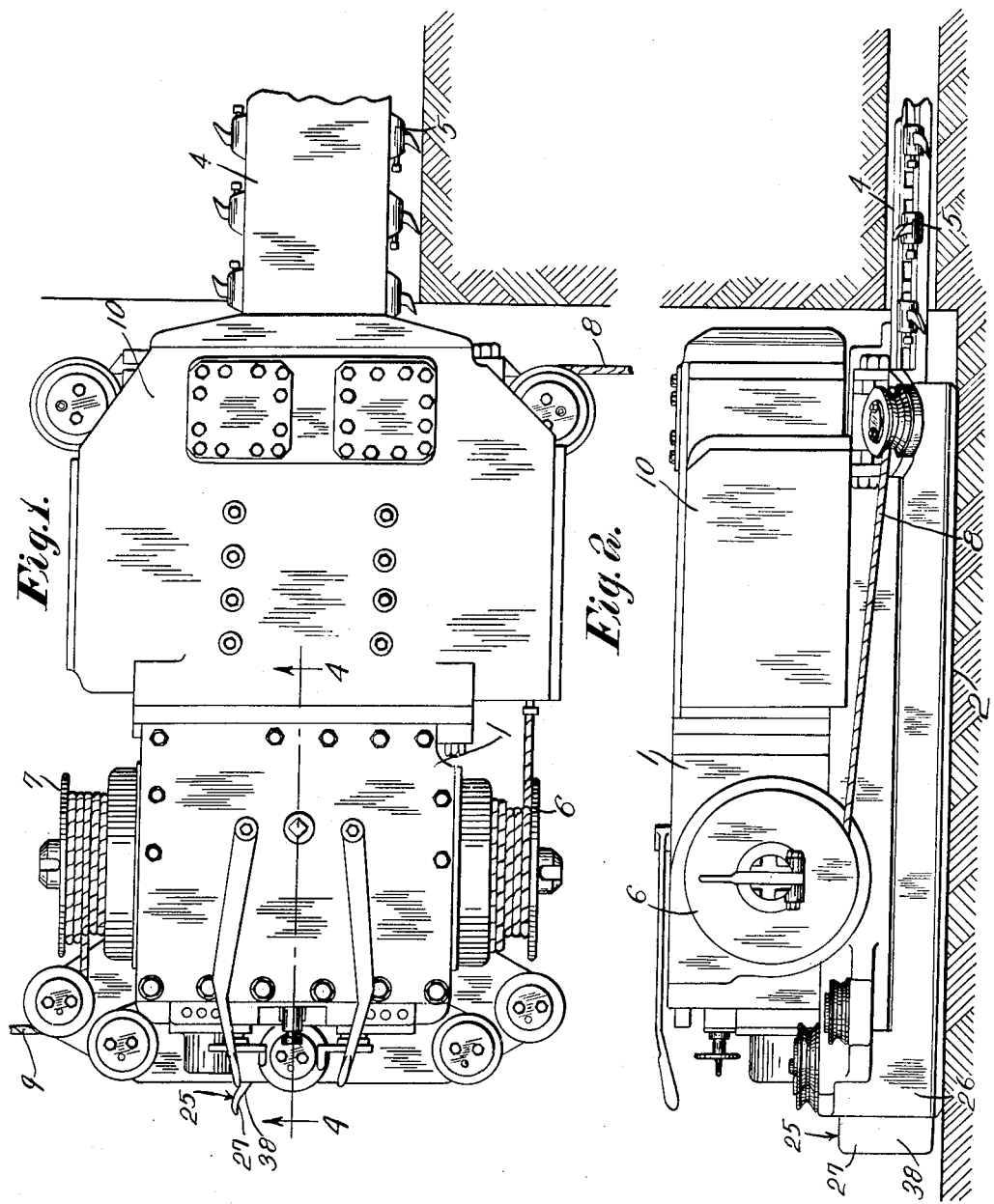

Inventor:
Joseph F. Joy.
by Charles F. Osgood,
Attorney.

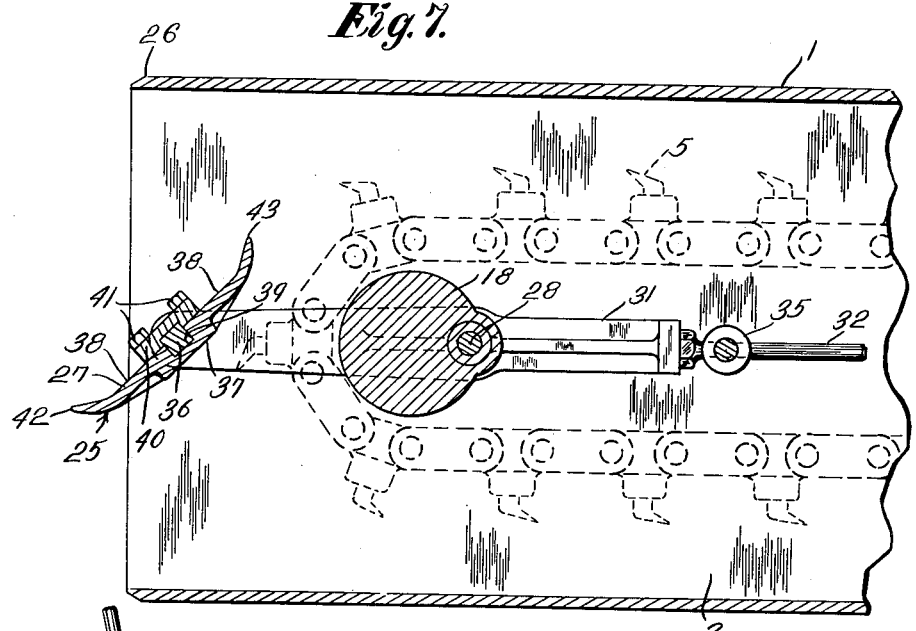
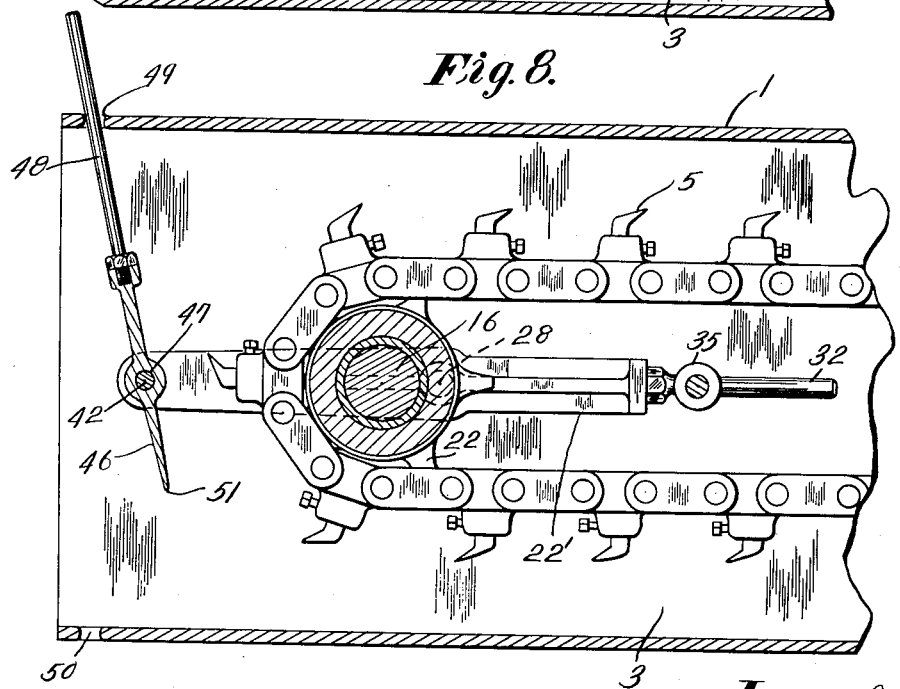

Inventor:
Joseph F. Joy.
by Charles F. Osgood,
Attorney.

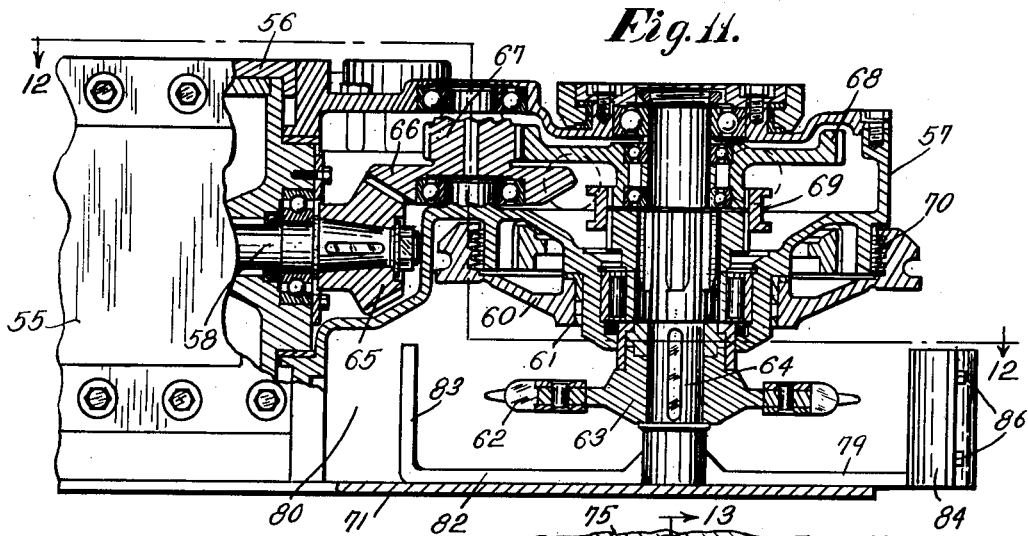

July 31, 1956 J. F. JOY 2,756,979
SLACK EJECTOR MECHANISM FOR A COAL CUTTING MACHINE
Filed June 1, 1948 10 Sheets-Sheet 7
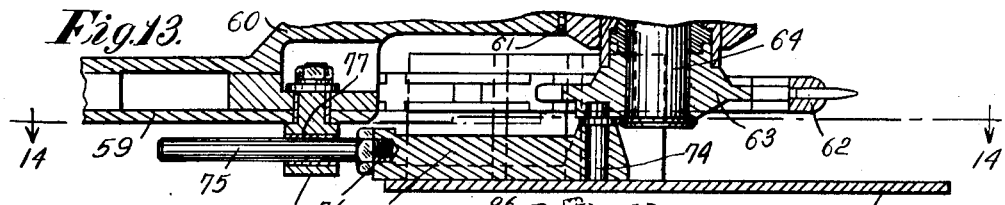
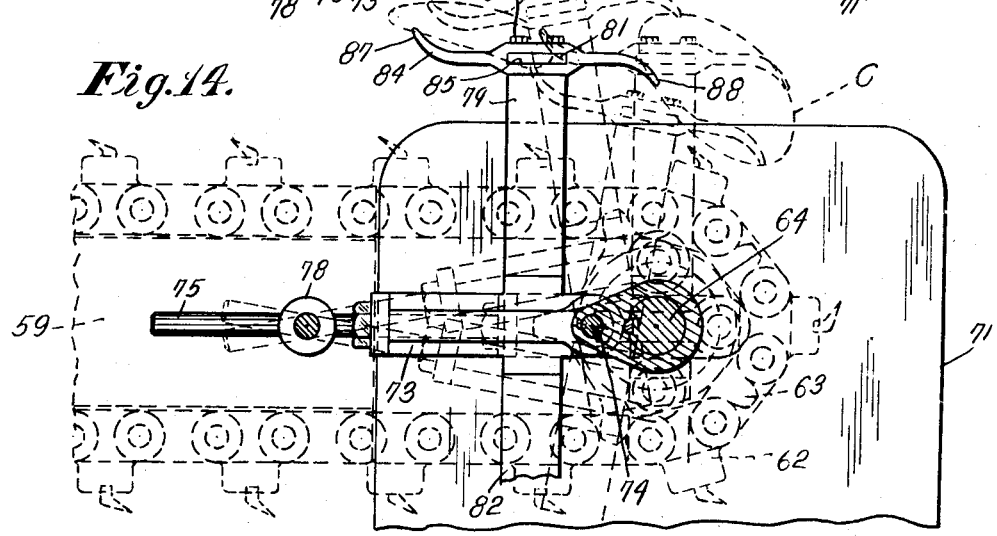
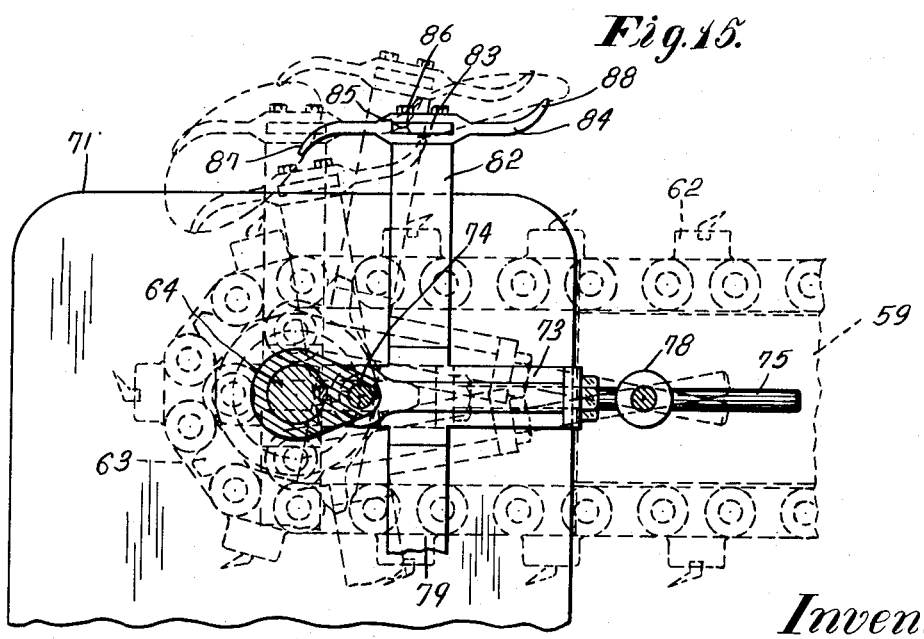
Inventor:
Joseph F. Joy.
by Charles F. Osgood,
Attorney.

July 31, 1956

J. F. JOY 2,756,979

SLACK EJECTOR MECHANISM FOR A COAL CUTTING MACHINE

Filed June 1, 1948

Inventor:
Joseph F. Joy,
by Charles F. Osgood,
Attorney.

Inventor:
Joseph F. Joy.
by Charles F. Osgood,
Attorney.

July 31, 1956  J. F. JOY  2,756,979
SLACK EJECTOR MECHANISM FOR A COAL CUTTING MACHINE
Filed June 1, 1948  10 Sheets-Sheet 10

Inventor:
Joseph F. Joy.
by
Charles F. Osgood,
Attorney.

United States Patent Office 2,756,979
Patented July 31, 1956

2,756,979

SLACK EJECTOR MECHANISM FOR A COAL CUTTING MACHINE

Joseph F. Joy, Pittsburgh, Pa., assignor to Joy Manufacturing Company, Pittsburgh, Pa., a corporation of Pennsylvania Application June 1, 1948, Serial No. 30,455

12 Claims. (Cl. 262—30)

This invention relates to slack ejector mechanisms and more particularly to slack ejector mechanisms designed for use with coal cutting machines for removing the slack coal or cuttings from the vicinity of the cutter chain and for ejecting them from the machine.

An object of the present invention is to provide an improved slack ejector mechanism for a coal cutting machine. Another object is to provide an improved slack ejector mechanism embodied in a coal cutting machine for removing the slack coal or cuttings from the vicinity of the cutter chain and for ejecting them rearwardly from the machine. A further object is to provide an improved slack ejector mechanism associated with a coal cutting machine and driven through improved connections from the shaft which drives the cutter chain drive sprocket. A still further object is to provide an improved slack ejector mechanism constructed and arranged in a novel manner. Still another object is to provide an improved slack ejector mechanism of the reversible type whereby, by a simple reversal of parts, the same may operate selectively in either of opposite directions. Still another object is to provide an improved reversible slack ejector mechanism for removing the slack coal or cuttings from the vicinity of the cutter chain of a reversible coal cutting machine irrespective of the direction in which the machine is operating. A still further object is to provide a slack ejector element mounted for oscillation and having its free end movable in an orbit in the vicinity of the cutter chain, with said free end movable in an arc substantially intersecting the direction of movement of the cuttings as they are thrown outwardly from the path of the cutter chain. Another object is to provide an improved slack ejecting device, arranged and mounted in an improved manner to move in an orbital path in adjacency to the cutter chain of a coal cutting machine, for removing the slack coal or cuttings from the vicinity of the cutter chain. A still further object is to provide an improved reversible slack ejector mechanism embodying a reversible ejector blade disposable selectively in different positions with respect to its actuating member. Yet another object is to provide an improved slack ejector mechanism mounted to swing with the cutter bar of a coal cutting machine, and adjustable with the cutter bar into different operating positions. A still further object is to provide a slack ejector mechanism driven in an improved manner from the cutter chain drive sprocket of a coal cutting machine. These and other objects and advantages of the invention will, however, hereinafter more fully appear.

In the accompanying drawings there are shown for purposes of illustration two forms and several modifications thereof which the invention may assume in practice.

In these drawings:

Fig. 1 is a top plan view of a coal cutting machine in which one illustrative form of the invention is embodied.

Fig. 2 is a side elevational view of the machine shown in Fig. 1.

Fig. 3 is an enlarged fragmentary rear end elevational view of the machine shown in Figs. 1 and 2, showing the improved slack ejector mechanism.

Fig. 4 is an enlarged view in longitudinal vertical section, taken substantially on line 4—4 of Fig. 1, with parts omitted.

Fig. 7 is a horizontal sectional view, similar to Fig. 5, showing the slack ejector blade or plate in its reversed operating position.

Fig. 8 is a horizontal sectional view, similar to Fig. 5, illustrating a modified construction.

Fig. 11 is a fragmentary view, with parts shown in central longitudinal vertical section, of a reversible coal cutting machine of the pivoted bar longwall type with which a further modified form of the invention is associated.

Fig. 12 is a horizontal sectional view, with parts shown in plan, taken substantially on line 12—12 of Fig. 11.

Fig. 13 is a detail vertical sectional view taken substantially on line 13—13 of Fig. 12.

Fig. 14 is a horizontal sectional view taken substantially on line 14—14 of Fig. 13, with different positions of the pusher plate shown in dotted lines.

Fig. 15 is a horizontal sectional view, similar to Fig. 14, showing the slack ejector plate or blade in its reversed operating position.

Figure 5:
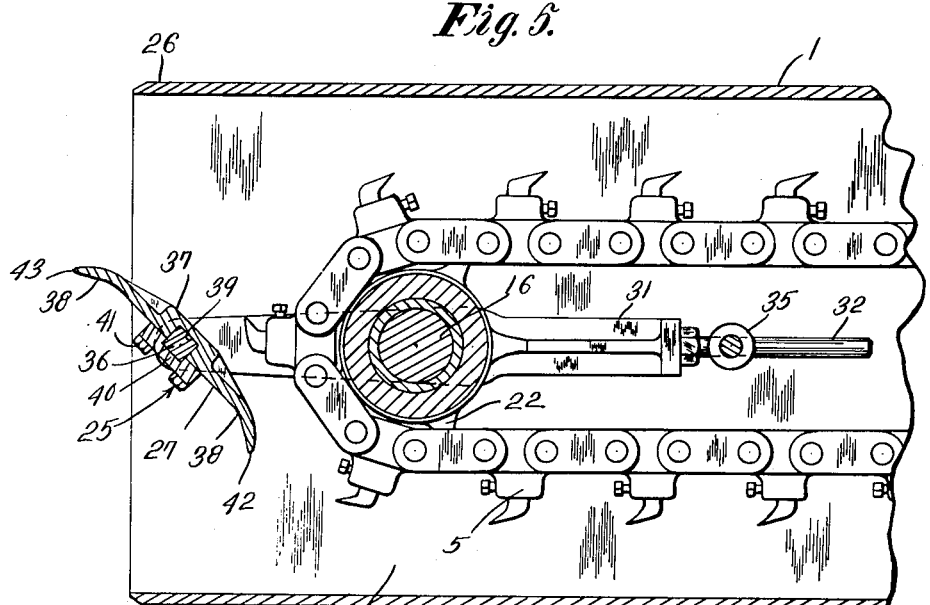
Fig. 5 is a horizontal sectional view taken substantially on line 5—5 of Fig. 4.
Figure 6:
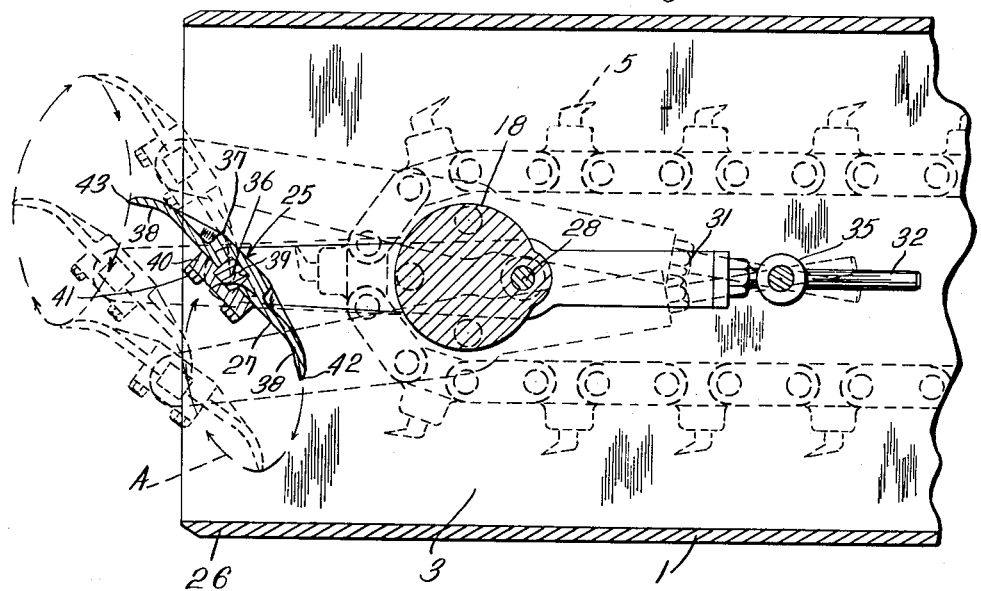
Fig. 6 is a horizontal sectional view taken substantially on line 6—6 of Fig. 4, with different positions of the pusher plate shown in dotted lines.

In certain illustrative embodiments of the invention, the improved slack ejector mechanism is shown embodied in a reversible coal cutting machine capable of cutting selectively in either of opposite directions; and the slack ejector mechanism, by a simple reversal of parts, may operate to eject the slack coal or cuttings from the vicinity of the cutter chain irrespective of the direction in which the machine is cutting. In one embodiment and modifications thereof, the slack ejector mechanism is non-reversible. The improved slack ejector mechanism may be associated with coal cutting machines of the shortwall, longwall and universal types, as hereinafter described.

The coal cutting machine shown in Figs. 1 to 10 inclusive is of the flexibly fed, shortwall, floor cutter type and may be generally like that disclosed in Patent No. 2,131,178, patented September 27, 1938, in which I am a coinventor. The coal cutting machine comprises a machine frame 1 slidable on its bottom 2 on the floor of a mine. Extending longitudinally throughout the length of the lower portion of the machine frame is a chamber 3, having arranged therein and secured to the machine frame the rearward portion of an elongated horizontal plane cutter bar 4, the latter having guided on its margin for circulation thereabout an endless cutter chain 5. The flexible feeding means of the machine comprises drums 6 and 7, each adapted to act as a feeding drum, or as a controlling drum, dependent on the direction of cutting, and both arranged on horizontal axes extending transversely of the machine at the opposite sides of the machine frame 1 and having respectively wound thereon cables 8 and 9, each selectively usable as a feeding or as a controlling cable. Carried by the machine frame is a reversible motor 10, having its power shaft operatively connected to the cutter chain and to the feeding and controlling drums for effecting drive thereof in either of opposite directions, as fully described in the patent above referred to. The cutter chain is driven by the motor through a spur pinion 11 (see Fig. 4) fixed to the rear end of the motor power shaft and meshing with a spur gear 12 keyed to a horizontal shaft 13, suitably journaled within the machine frame. Secured to and driven by the shaft 13 is a bevel pinion 14, meshing with a bevel gear 15, having its hub journaled on a bearing supported by a vertical shaft 16, likewise suitably journaled within the machine frame. The gear 15 is connectible to the shaft 16 by a conventional sliding clutch 17. Secured, as by screws, to the lower end of the shaft 16 is a plate 18 having a transverse portion 19 fitted in a transverse groove 20 in the shaft; and a shear pin 21, passing through openings in the transverse portion 19 and in a chain sprocket 22, secures the chain sprocket 22 to the shaft 16 for rotation therewith. The chain sprocket 22 engages and drives the endless cutter chain 5 in a well known manner.

The feeding and controlling cables 8 and 9 may be extended from the feeding and controlling drums 6 and 7, around suitably located guide sheaves on the machine in a conventional manner, and may be connected at their free ends to suitable anchor jacks located at the opposite ribs of the room of a mine. The cutter chain 5, when connected by the clutch 17 in driven relation with the motor 10, may be rapidly circulated about the margin of the cutter bar, and as the cables are wound in and controlled by their respective drums, the cutter bar may be sumped beneath the coal at the left hand rib, thereafter be fed transversely from left to right across the coal face to cut a horizontal kerf beneath the coal, and finally be withdrawn from the face at the right hand rib. The feeding drum effects feeding of the machine, and the controlling drum may control the angle of the machine with respect to the coal face during the cutting operation, in the manner well known to those skilled in the art. By reversing the motor 10, rearranging the cables 8 and 9 on their respective drums and reversing the position of the cutter bits on the cutter chain, the machine may cut in the opposite direction, i. e., from right to left. During either direction of cutting, the cuttings created by the cutters of the cutter chain are carried back from the kerf through the chamber 3 extending through the lower portion of the machine frame to discharge at the rear end of the machine. Since the mode of operation of a shortwall coal cutting machine of the type disclosed is well known and is fully described in the patent above referred to, further description thereof is herein unnecessary.

The improved slack ejector mechanism shown in Figs. 1 to 7 inclusive is generally designated 25 and is embodied in a rearward extension 26 of the lower portion of the machine frame of the coal cutting machine, and is arranged in such a manner that its slack ejector device or orbitally movable sweep 27 removes the slack coal or cuttings from the vicinity of the cutter chain at the rear end of the chamber 3 and ejects the cuttings rearwardly of the machine, out of the machine path. The slack ejector device comprises a vertical eccentric pin or crank pin 28, secured to the plate 18 and engaged in a bearing sleeve 29, arranged in a vertical bore 30 in an oscillatory arm or lever 31, the latter herein arranged horizontally generally lengthwise of the machine within the lower portion of the chamber 3 beneath the chain drive sprocket 22, as shown in Fig. 4. If desired, the chain drive sprocket 22 may be keyed, or otherwise secured, directly to the drive shaft 16, and the eccentric pin 28 may be secured directly to the chain sprocket 22. The arm 31 has a horizontal, forwardly extending, reciprocatory rodlike element 32, threadedly secured at 33 to its forward end in advance of the chain sprocket, and this rodlike element is slidably guided at 34 within an oscillatory bearing block 35 which is pivotally mounted within the machine frame to oscillate about a vertical axis lying in a central longitudinal vertical plane of the machine. The horizontal arm 31 has a relatively thin portion which projects rearwardly from beneath the chain sprocket 22 below the cutter chain orbit and has an upstanding integral portion 36 at its rear end, and this upstanding portion is herein polygonal, preferably square, in cross section, as shown in Fig. 5. An ejector blade or pusher plate 37 has oppositely projecting portions 38, 38, and a vertical slot 39 midway between the portions 38, 38 receives the square vertical portion 36 in the manner shown. The pusher plate 37 is firmly clamped to the vertical square portion 36 by a clamping plate 40, also having a vertical groove receiving the square portion 36 and rigidly secured to the plate 37 as by screws 41. The pusher plate 37 extends vertically substantially the entire height of the chamber 3, as shown in Figs. 3 and 4, and has, on its inner portion 38, a vertical penetrating edge 42. The outer, inactive portion 38 of the plate has a similar penetrating edge 43 which is inactive, with the parts arranged as shown. As the cutter chain 5 is rapidly circulated about the margin of the cutter bar, the eccentric pin or crank 28 effects oscillation of the horizontal arm 31, moving the rear end of the arm horizontally in an orbital path, and causing the penetrating edge 42 of the inner, active portion 38 of the pusher plate to trace an orbital path, as indicated in construction lines at A in Fig. 6, and move in the direction of the arrows, thereby to engage the slack coal or cuttings in the vicinity of the cutter chain and to move the cuttings rearwardly in the chamber 3 and to eject them rearwardly from the machine. To enable operation of the slack ejector mechanism during operation of the coal cutting machine in the reverse direction, i. e., from right to left, the pusher blade 37, by removing the clamping plate 40, may be detached from the vertical square portion 36 and turned through 90° with respect to the square portion 36 and again secured in place by the clamping plate, as shown in Fig. 7, with the penetrating edge 43 then active so that the slack coal or cuttings may be removed from the machine as the cutter chain travels in the opposite direction during reverse cutting. The inner vertical penetrating edge of the ejector blade, in either position of the blade, moves forwardly and laterally toward the advancing side of the machine frame and then rearwardly and laterally inwardly toward the opposite side of the frame so that the slack coal or cuttings is engaged near the cutter chain, moved rearwardly in the chamber 3 away from the cutter chain, and as the ejector blade continues to move in its orbit, the cuttings are ejected rearwardly from the machine into the bottom of the pile of ejected cuttings. It will be noted that the arm 31 not only swings horizontally from side to side but also moves horizontally back and forth in a generally longitudinal direction beneath the cutter chain, and during this latter motion, the rodlike portion 32 slides in the oscillatory bearing block 35.

Figure 9:
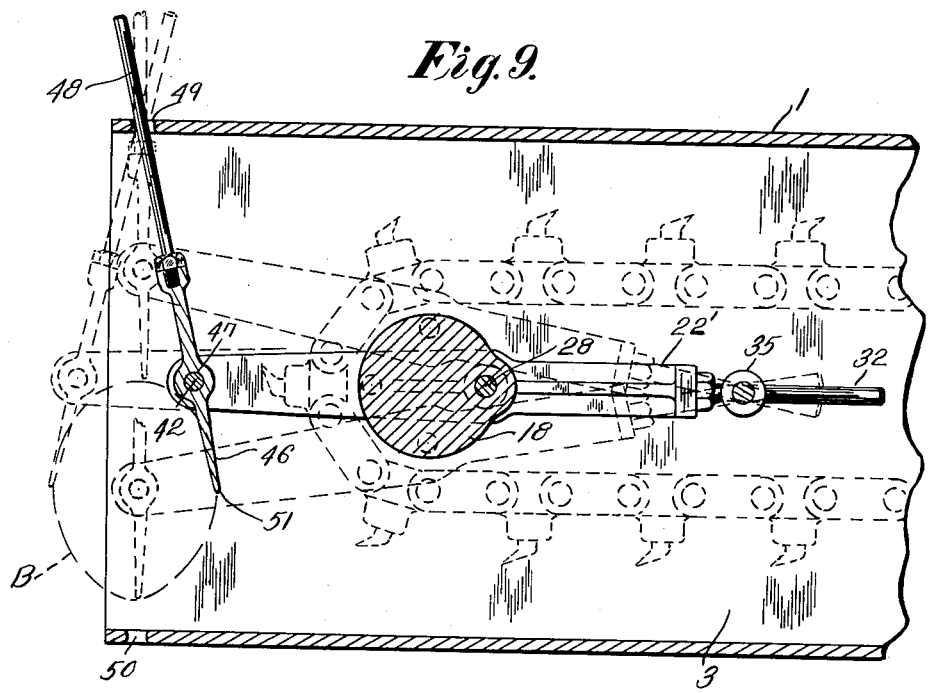
Fig. 9 is a horizontal sectional view, similar to Fig. 6, showing, in dotted lines, the ejector plate of Fig. 8 in different operating positions.
Figure 10:
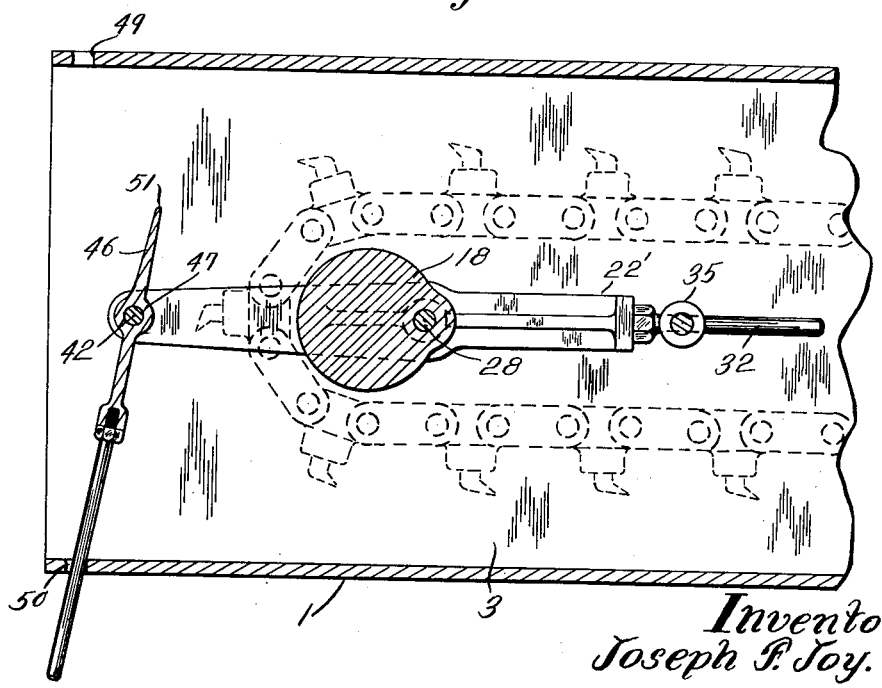
Fig. 10 is a horizontal sectional view, similar to Fig. 7, showing the ejector plate of Fig. 8 in its reversed operating position.

In the modified embodiment of the invention shown in Figs. 8 to 10 inclusive, the oscillatory arm 22' has a vertical pivot pin 42 secured to its rearward end, and an ejector plate or sweep blade 46 is pivoted at 47 to this pin to oscillate in horizontal planes. This blade 46 has a horizontal rodlike portion 48 which is slidably mounted in an opening 49 in the receding side of the machine frame and projects laterally outwardly from the frame in the manner shown. An oscillatory bearing block, similar to the bearing block 35, may be provided for guiding the rodlike portion 48 within the side of the machine frame, if desired. During cutting in the reverse direction, i. e., from right to left, the blade 46 may be removed from the arm and replaced in its oppositely disposed position shown in Fig. 10, with the rodlike portion 48 guided in a corresponding opening 50 in the opposite side of the machine frame. The blade has a vertical penetrating edge 51, and as the blade moves in an orbital path, as indicated in construction lines at B in Fig. 9, the blade moves inwardly and laterally toward the advancing side of the machine frame and then rearwardly to move the cuttings rearwardly in the chamber 3 and then, as its orbital movement continues, moves rearwardly and laterally toward the receding side of the frame to eject the cuttings.

In the embodiment and modification thereof above described, the orbits A and B are located in the chamber 3 at the advancing side of the machine so that as the cuttings are moved rearwardly in the chamber 3 by the cutter chain, and as the latter travels around the chain sprocket, they are engaged by the ejector plate and effectively moved rearwardly out of the chain path and ejected from the chamber. The ejector blade or pusher plate at the free end of the oscillatory arm, as it is oscillated, has an arc of movement substantially intersecting the direction of travel of the slack coal or cuttings thrown away from the cutter chain as the latter travels around the chain sprocket and operates to sweep the cuttings from the vicinity of the cutter chain and to eject the cuttings rearwardly of the machine.

In the modified construction shown in Figs. 11 to 15 inclusive, the slack ejector mechanism is shown associated with a coal cutting machine of the flexibly fed, pivoted bar longwall type which may be similar to that disclosed in Patent No. 2,162,722, patented June 20, 1938, in which I am a coinventor. The machine generally comprises a machine frame 55 adapted to slide on its bottom over the floor of a mine. The machine frame comprises a motor frame section 56 and a cutter frame section 57, and the frame section 56 houses a motor having a longitudinally extending power shaft 58. A cutter bar 59 is carried by a swiveled hanger frame 60 which is pivotally mounted at 61 on the cutter frame section to swing horizontally into positions at right angles to the longitudinal axis of the machine frame, in the manner fully disclosed in Patent No. 2,162,722 above referred to. Guided for circulation about the margin of the cutter bar is an endless cutter chain 62 which is engaged and driven by a chain sprocket 63 arranged coaxially with the bar pivot and, as shown in Fig. 11, keyed to a vertical shaft 64. The chain drive sprocket is driven from the machine motor by a bevel pinion 65 keyed to the motor power shaft and meshing with a bevel gear 66. Rotatable with the bevel gear 66 is a spur pinion 67 meshing with a large spur gear 68 connectible by a conventional sliding clutch 69 to the vertical shaft 64. A suitable frictional lock 70 is arranged between the cutter frame section and the swiveled hanger frame 60 for locking the cutter bar in its different adjusted positions with respect to the machine frame. The machine frame includes a bottom skid plate 71 on which the motor frame section is mounted, and this skid plate extends beneath the cutter bar, in the manner shown in Figs. 11 and 12.

The modified slack ejector mechanism embodied in the coal cutting machine shown in Figs. 11 and 12 comprises, as shown most clearly in Fig. 13, an oscillatory arm or lever 73, herein arranged horizontally generally lengthwise of the cutter bar 59 between the bottom of the cutter chain drive sprocket 63 and the bottom skid plate 71. The chain drive sprocket 63 has secured thereto and projecting downwardly therefrom a vertical eccentric pin or crank pin 74 which is engaged in an opening in the adjacent end of the arm. The arm 73 has a horizontal forwardly extending reciprocatory rodlike element 75 threadedly secured at 76 at its rearward end to the opposite end of the arm 73 and slidably guided at 77 within an oscillatory bearing block 78, similar to the bearing block 35 above described, which is pivotally mounted upon the bar hanger frame to oscillate about a vertical axis lying in the central longitudinal vertical plane of the cutter bar. Herein preferably formed integral with the oscillatory arm 73, in right angular relation thereto, is a lateral arm 79, herein arranged in a horizontal cuttings-receiving chamber 80 beneath the cutter frame section and guided for oscillatory movement on the top surface of the bottom skid plate 71 in the manner shown. The horizontal arm 79 has an upstanding end portion 81 of rectangular cross section. An arm 82, similar to the arm 79 and in alignment therewith, projects horizontally from the opposite side of the oscillatory arm 73 and has a similar upstanding rectangular end portion 83. A vertical ejector blade or pusher plate 84, similar to the plate 37 of the embodiment above described, has a rectangular opening 85 for selectively receiving the upstanding end portions 81 or 83, depending upon the direction in which the machine is operating, as later explained. Set screws 86 are provided for securing the blade to either upstanding portion. The blade has oppositely curved end portions 87 and 88. When the cutter bar 59 is swung into and held in the right angle position shown in full lines in Fig. 12 and in broken lines in Fig. 14, and the cutter chain 62 is rapidly circulated about the margin of the cutter bar by the machine motor through the chain sprocket 63 driven through the gearing above described, the eccentric pin or crank 74 effects oscillation of the horizontal arm 73, moving the outer free end of the arm 79 horizontally in an orbit and causing the pusher plate or ejector blade 84 to trace an orbital path, as indicated at C in dotted lines in Fig. 14, thereby to engage the slack coal or cuttings in the vicinity of the cutter chain and to move the cuttings rearwardly in the chamber 80 and to eject them rearwardly from the machine. As in the embodiment above described, the pusher plate, as it is oscillated, has an arc of movement substantially intersecting the direction of travel of the cuttings thrown away from the cutter chain as the latter passes around the chain drive sprocket and operates to sweep the cuttings from the vicinity of the cutter chain and to eject the cuttings rearwardly. When the machine is operated to cut in the reverse direction, the cutter bar is swung into and held in the right angle position shown in broken lines in Fig. 15 at the opposite side of the machine frame, and, at that time, the machine motor is reversed and the cutter bits are reversed in position on the cutter chain in a well known manner. The pusher plate 84 has been removed from the upstanding end portion 81 and has been reversed end for end and secured to the upstanding end portion 83 of the oppositely extending arm 82 which is, at that time, located at the rear end of the machine, as shown. With the parts thus disposed in reversed operating position, and with the cutter chain rapidly circulating about the margin of the cutter bar, the arm 82 is oscillated by the crank pin 74, causing the pusher plate or ejector blade 84 to trace an orbital path to engage and eject the cuttings rearwardly from the vicinity of the cutter chain. In this improved construction, it will be noted that the ejector mechanism is mounted to swing horizontally with the cutter bar as the latter is swung in either of its reversed positions with respect to the machine frame, and that but a simple rearrangement of the pusher plate is necessary to effect reverse operation.

Figure 16:
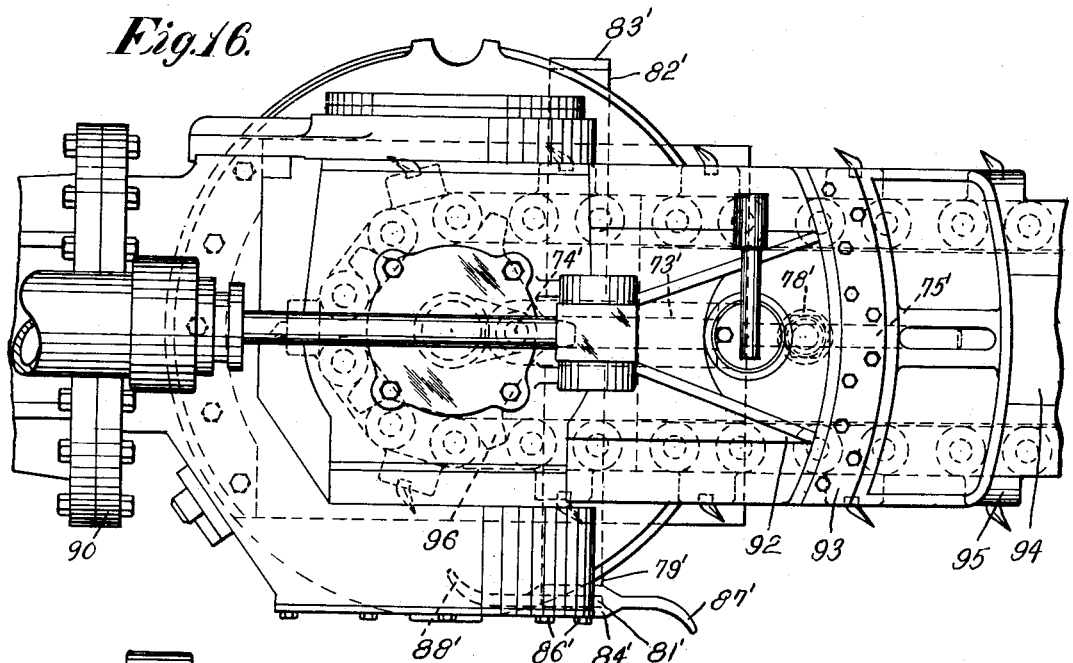
Fig. 16 is a fragmentary plan view of the cutter head of a coal cutting machine of the universal type, illustrating a further modified embodiment of the invention.
Figure 17:
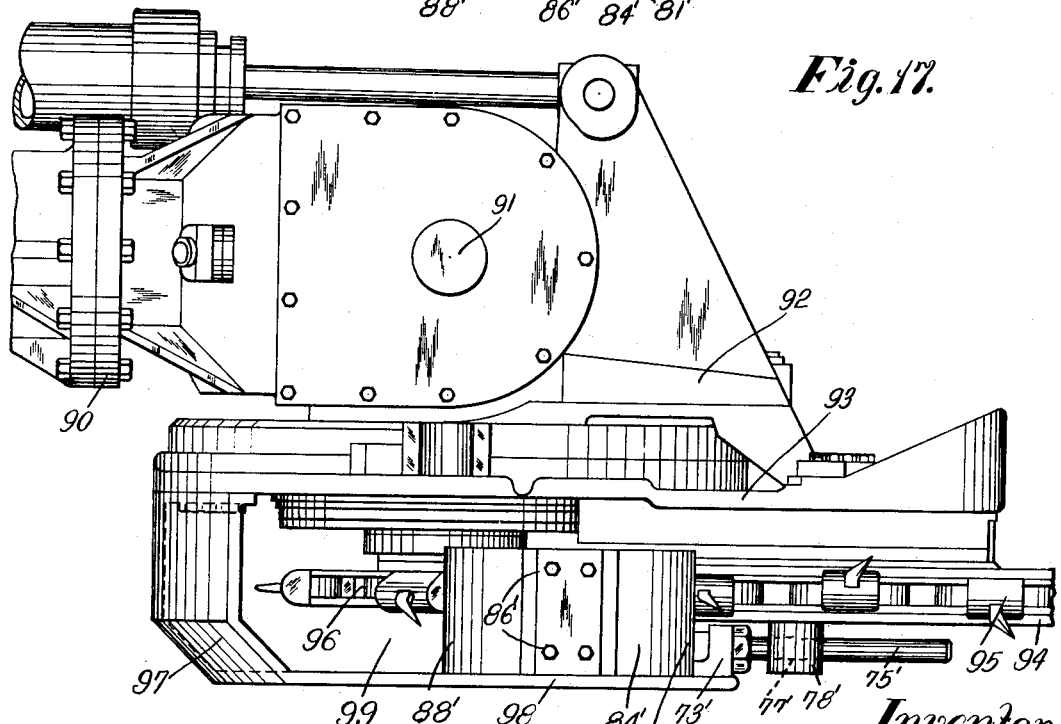
Fig. 17 is a side elevational view of the cutter head and slack ejector mechanism shown in Fig. 16.
Figure 18:
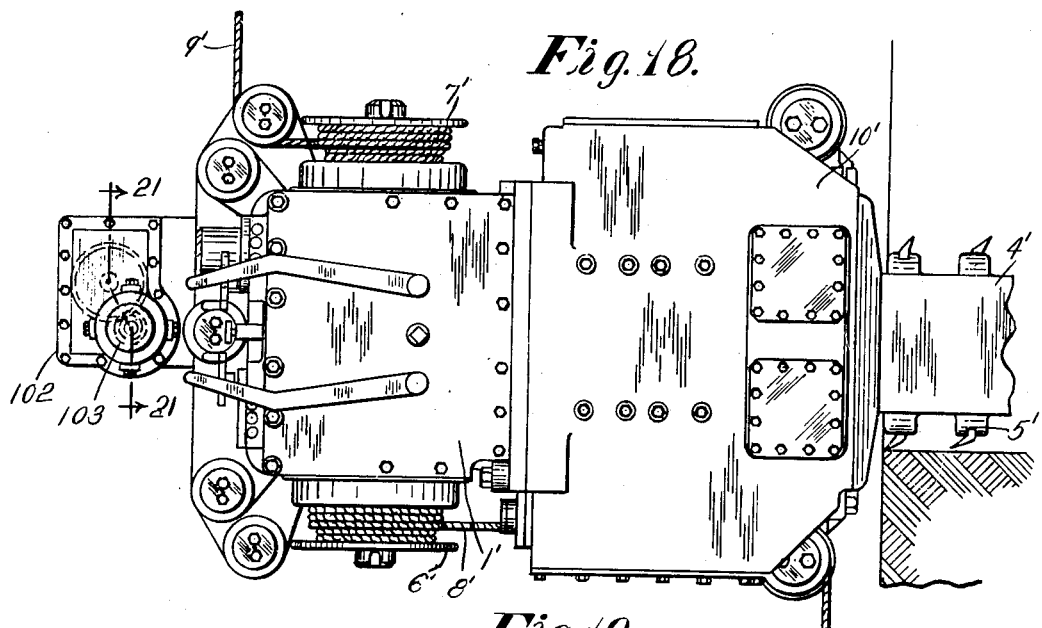
Fig. 18 is a top plan view of a coal cutting machine in which another illustrative form of the invention is embodied.
Figure 19:
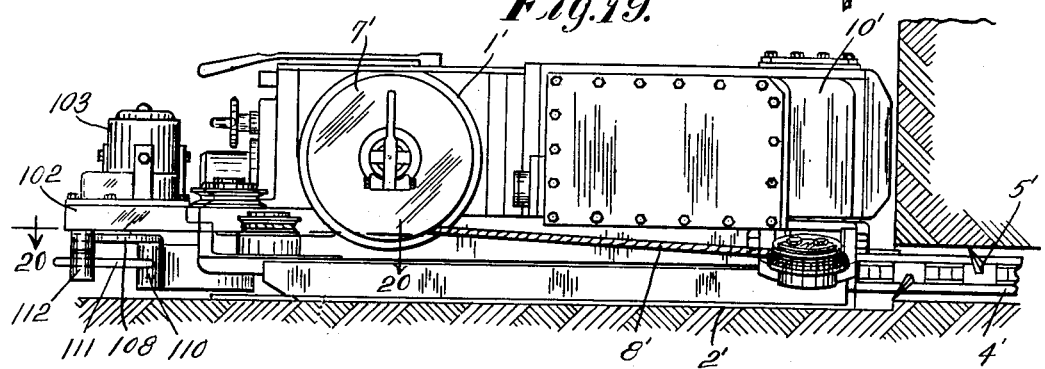
Fig. 19 is a side elevational view of the machine shown in Fig. 18.

In the modification shown in Figs. 16 and 17, the slack ejector mechanism of the embodiment above described is associated, with suitable modifications, with a coal cutting machine of the track mounted, universal type which may be similar to that disclosed in my Patent No. 2,229,087, patented January 21, 1941. The slack ejector mechanism in this form is primarily useful when the cutter bar is positioned to cut a horizontal kerf at the level of the mine floor. The coal cutting machine, as fully disclosed in the patent last referred to, has a swingable boom frame which supports a rotatable cutter head 90 which, in turn, has pivotally mounted thereon, at 91 on an axis at right angles to the head axis, a tiltable frame 92. Swiveled on the frame 92 on an axis at right angles to the head axis and the pivotal axis 91 is a hanger frame 93 which carries a cutter bar 94. A cutter chain 95 is guided for circulation about the margin of the cutter bar and is driven by a chain sprocket 96. In this instance, secured as by brackets 97 to the hanger frame 93 is an outer plate 98. The slack ejector mechanism is generally similar to that shown in Figs. 11 to 15, inclusive and includes an oscillatory arm 73' arranged in a chamber 99 and preferably guided on the inner surface of the plate 98 and arranged generally lengthwise of the cutter bar 94 between the chain sprocket 96 and the outer plate. The chain sprocket has secured thereto a crank pin 74' as in the embodiment above described and which is likewise engaged in an opening in the arm at its adjacent end. The arm has a horizontal, forwardly extending rodlike element 75' secured to the opposite end of the arm 73' and slidably guided at 77' within an oscillatory bearing block 78' which is pivotally mounted on the bar hanger frame 93 to oscillate about an axis parallel to the sprocket axis and lying in a longitudinal vertical plane including the head and sprocket axes. Integral with the arm 73' and projecting laterally therefrom at opposite sides thereof are horizontal arms 79' and 82' which respectively have upstanding rectangular end portions 81' and 83' selectively to which a vertical ejector blade or pusher plate 84' is attachable, depending upon the direction of operation of the coal cutting machine. The blade 84' has set screws 86' for securing the same to the end portions 81' and 83' and is formed with oppositely curved end portions 87' and 88'. When the cutter bar 94 is disposed in the central position shown in Figs. 16 and 17 and the cutter chain is rapidly circulating in its orbit about the margin of the cutter bar, the crank pin 74' is driven by the chain sprocket 96, moving the outer end of the arm 79' horizontally and causing the pusher plate or ejector blade 84' to trace an orbital path, thereby to engage the slack coal or cuttings in the vicinity of the cutter chain and to move the cuttings in the chamber 99 outwardly from the vicinity of the cutter chain. When the cutter bits are reversed in position on the cutter chain and the machine motor is reversed to drive the cutter chain in the opposite direction in a well known manner, the pusher plate 84' is detached from the end arm portion 81' and reversed end for end and attached to the end arm portion 83' at the opposite side of the cutter head, and, at that time, when the cutter chain is driven, the cuttings are moved from the vicinity of the cutter chain and discharged laterally from the chamber 99 at the opposite side of the cutter head.

Figure 20:
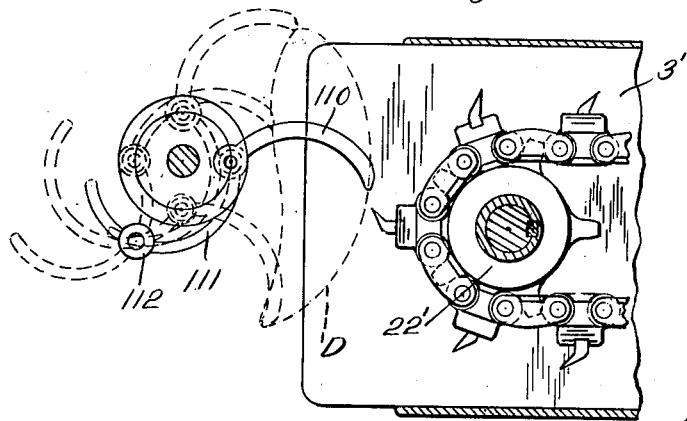
Fig. 20 is a horizontal sectional view, with parts shown in full, taken substantially on line 20—20 of Fig. 19.
Figure 21:
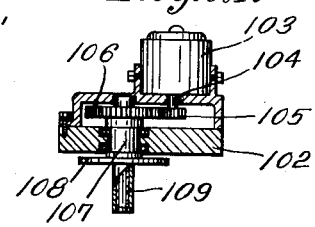
Fig. 21 is a detail vertical sectional view taken substantially on line 21—21 of Fig. 18.

Another embodiment of the invention is shown in Figs. 18 to 21 inclusive. In this embodiment, the improved slack ejector mechanism is associated with a coal cutting machine of the flexibly fed, shortwall, floor cutter type similar to that shown in Figs. 1 and 2, and like parts of the machine are designated by like but primed reference numerals. The modified slack ejector mechanism is, in this instance, incapable of reverse operation and, accordingly, the coal cutting machine, when the slack ejector mechanism is associated therewith, can operate in only one direction. If desired, however, a different, reversely operating ejector unit may be employed during the reverse operation of the machine. The ejector mechanism comprises a frame 102 suitably attached to the rear end of the machine frame, and the frame carries a vertical motor 103 whereby the ejector mechanism may be driven independently of the machine motor. Evidently, the slack ejector mechanism of this embodiment may be driven from the machine motor in the manner above described, if desired. The motor has fixed to its vertical power shaft 104 a spur pinion 105 meshing with a large spur gear 106 fixed to a vertical shaft 107, herein arranged parallel with the motor shaft and suitably journaled in the frame 102. If desired, other types of speed reducing gearing may be arranged between the motor shaft and the shaft 107 to obtain the desired speed reduction. Secured to the lower end of the shaft 107 below the frame 102 is a crank disk 108 having a crank pin 109. Pivotally attached to the crank pin is a vertically disposed curved ejector blade 110, and secured to this blade is a curved guide arm 111 slidably guided in a guide block 112 swiveled on a vertical axis at the bottom of the frame 102. During operation of the coal cutting machine and as the cutter chain is rapidly circulated about the margin of the cutter bar, the cuttings or slack coal are brought back from the kerf by the cutter chain and moved rearwardly through the chamber 3' to discharge at the rear end of the machine. The curved ejector blade 110, as it is oscillated by the crank pin 109, has its free end movable in an arc which substantially intersects the direction of travel of the cuttings or slack coal as they are thrown outwardly from the path of the cutter chain as the latter passes around the cutter chain sprocket 22', as shown in Fig. 20. Thus the free end of the ejector blade moves in an orbital path, as indicated in broken lines at D in Fig. 20, and the blade operates to sweep the cuttings from the vicinity of the cutter chain and to eject the cuttings rearwardly from the chamber 3' of the machine frame.

Figure 22:
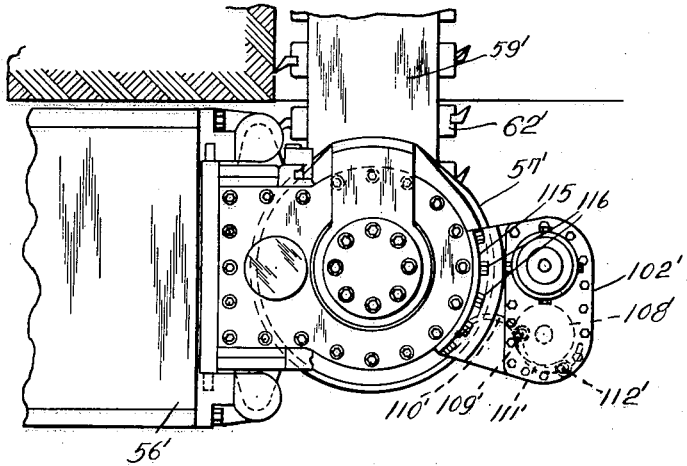
Fig. 22 is a fragmentary plan view of a coal cutting machine of the pivoted bar longwall type with which a modification of the slack ejector mechanism shown in Figs. 18 to 21 inclusive is associated.
Figure 23:
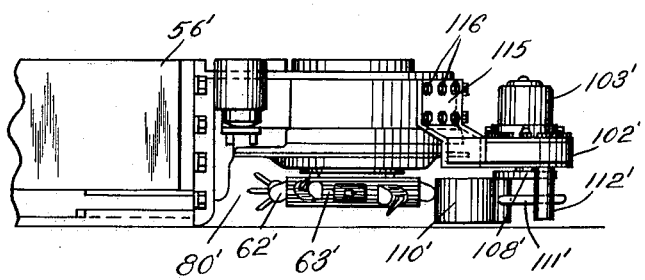
Fig. 23 is a side elevational view of the machine and slack ejector mechanism shown in Fig. 22.

In the modification shown in Figs. 22 and 23, the slack ejector mechanism of the embodiment shown in Figs. 18 to 21 inclusive is associated, with suitable modification, with a coal cutting machine of the pivoted cutter bar, longwall type, similar to that shown in Figs. 11 and 12. In this construction, the ejector mechanism is not mounted to swing with the cutter bar and must be detached from the cutter frame section of the machine when the cutter bar is swung into its different operating positions at the opposite sides of the machine frame. The slack ejector mechanism, in this instance, comprises a frame 102' detachably secured by a bracket 115 and attaching screws 116 to the cutter frame section of the machine at the rear end of the machine, as shown in Fig. 22. The frame 102' carries a vertical motor 103' which has its power shaft connected through speed reducing gearing to a crank disk 108'. The crank disk has a crank pin 109' which is pivotally connected to a curved ejector blade 110'. The blade has a curved guide arm 111' slidably guided in a swiveled guide block 112' carried at the bottom of the frame 102'. Thus, as the ejector blade is oscillated by the crank pin, its free end moves in an orbital path in the vicinity of the cutter chain as the latter passes around the chain drive sprocket 63' to sweep the cuttings outwardly from the chamber 80'. When the cutter bar 59' is swung into its opposite right angle position, the ejector mechanism is detached from the machine, and when the cutter bar is properly positioned for its reverse operation and has its cutter bits and direction of travel reversed in a well known manner, the ejector mechanism, which, at that time, is provided with a bracket 115 of opposite hand, may be re-attached to the machine in a different position so that the cuttings may be ejected from the opposite side of the cutter frame section. A different, reversely operating ejector unit may be employed, if desired, during the reverse cutting operation.

Figure 24:
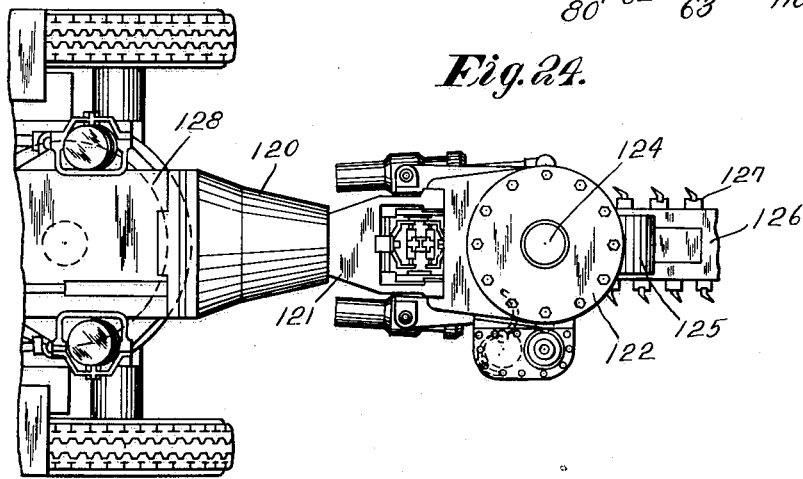
Fig. 24 is a fragmentary top plan view of a coal cutting machine of the universal type with which the modified form of slack ejector mechanism shown in Figs. 18 to 21 inclusive is associated.
Figure 25:
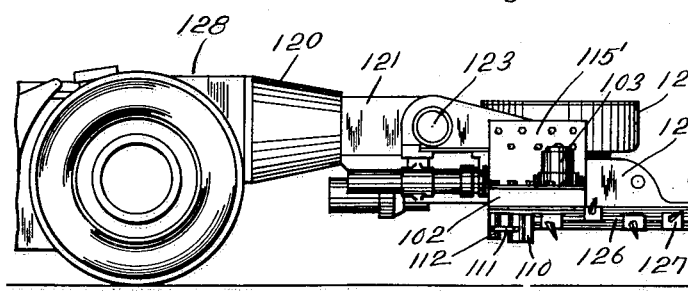
Fig. 25 is a side elevational view of the machine and slack ejector mechanism shown in Fig. 24.

In the modification shown in Figs. 24 and 25, the slack ejector mechanism of the embodiment shown in Figs. 18 to 21 inclusive is associated, with suitable modification, with a coal cutting machine of the rubber tired, universal type, similar to that disclosed in Patent No. 2,396,237, patented March 12, 1946, and owned by the same assignee as the present invention. The coal cutting machine has a swingable boom frame 120 carrying a rotatable cutter head 121 on which a tiltable frame 122 is pivoted at 123 on an axis at right angles to the axis of head rotation. Swiveled at 124 on the tiltable frame 122 on an axis at right angles to the axis of head rotation and the pivotal axis 123 is a hanger frame 125 which carries a cutter bar 126. Guided for circulation about the margin of the cutter bar is an endless cutter chain 127 driven by a motor 128 which is carried by the boom frame 120 and is operatively connected to the cutter chain in the manner fully disclosed in the patent last above referred to. The slack ejector mechanism, in this construction, is primarily useful when the cutter head is adjusted so that the cutter bar is operating to cut a horizontal kerf at the level of the mine floor, and the ejector mechanism may be identical to that shown in Figs. 23 and 24, with the exception that the bracket 115' is shaped differently and is arranged to support the ejector mechanism in operating position at the side of the tiltable frame 122. An opposite hand bracket may be employed to support the ejector mechanism in reversed position at the opposite side of the cutter head, in an obvious manner, when the coal cutting machine is operating in the reverse direction. If desired, a different reversely operating ejector unit may be employed during the reverse cutting operation. As in the embodiment shown in Figs. 18 to 21 inclusive, the curved ejector blade, as it is oscillated by the crank pin, has its free end moved in an arc substantially intersecting the direction of travel of the cuttings or slack coal as they are thrown away from the cutter chain, and operates to sweep the cuttings from the vicinity of the cutter chain and eject the cuttings outwardly from the side of the cutter head. Otherwise, the ejector mechanism of this modification is similar to that shown in Figs. 18 to 21 inclusive.

As a result of this invention, it will be evident that an improved slack ejector mechanism is provided for a coal cutting machine whereby the slack coal or cuttings created and brought back from the kerf by the cutter chain during the kerf cutting operation are effectively removed from the vicinity of the cutter chain and ejected from the machine. By the provision of the novel structure disclosed, the oscillatory ejector blade has its free end movable in an arc which substantially intersects the path of travel of the cuttings or slack coal as they are thrown away from the cutter chain, and operates to sweep the cuttings from the vicinity of the cutter chain. By arranging the slack ejecting device or horizontal sweep in the manner disclosed in certain embodiments, with the oscillatory arm located horizontally, generally longitudinally beneath the chain drive sprocket and driven by the sprocket drive shaft, extreme compactness is obtained. The ejector plate effectively engages the cuttings near the cutter chain and moves them outwardly in the cutter chain and ejects them outwardly from the machine into the bottom of the pile of ejected cuttings so that not only are the cuttings effectively removed but also the creation of dust is reduced to a minimum. The device is rugged and simple in design and may be applied to a conventional coal cutting machine with but small change. By a simple reversal of parts, the device of certain embodiments may operate in either of opposite directions or be reversely supported to remove the cuttings from the machine during either direction of cutting. By mounting the slack ejector mechanism to swing with the cutter bar in the manner of certain embodiments, the ejector mechanism is automatically moved to reversed position whenever the cutter bar is adjusted into reversed position. Other manners of use and advantages of the invention will be clearly apparent to those skilled in the art.

While there are in this application specifically described two forms and several modifications thereof which the invention may assume in practice, it will be understood that these forms and modifications of the same are shown for purposes of illustration and that the invention may be further modified and embodied in various other forms without departing from its spirit or the scope of the appended claims.

What I claim as new and desire to secure by Letters Patent is:

1. In a slack ejector mechanism, the combination comprising a casing having a chamber through which the slack coal may be moved, said chamber having a discharge opening, a reciprocatory and angularly movable arm in said chamber and having an outer end, means on said casing for mounting said arm in said chamber for reciprocatory and angular movements, a crank for reciprocating and angularly moving said arm to cause oscillatory movement of said outer end in a closed orbit, an ejector plate pivotally connected to the outer oscillatory end of said arm, and means on said casing for reciprocably and angularly guiding said ejector plate, said oscillatory end of said arm effecting orbital movement of said ejector plate in said chamber.

2. A reversible slack ejector mechanism comprising a casing having a horizontal chamber for receiving slack coal, a member arranged in said chamber along the bottom thereof and mounted on said casing for horizontal oscillatory movement about an upright pivotal axis, said member having a free outer end disposed remote from said pivotal axis, means connected to said member for oscillating the latter to cause the free outer end of said member to trace an orbital path, reversible driving means connected to said member for oscillating the latter in either of opposite directions, a transposable, double-ended, reversible ejector plate, and means for attaching said plate in either of its transposed positions to said outer end of said member whereby said plate may move to effect ejection of the slack coal from said chamber irrespective of the direction of drive of said oscillatory member.

3. A reversible cuttings conveying mechanism comprising, in combination, a frame having a chamber adapted to receive cuttings to be conveyed, and a cuttings conveying device carried by said frame and including an oscillatory element movable horizontally in said chamber and having oppositely extending arms, a transposable, reversible, ejector blade, and attaching means at the ends of said arms for selectively receiving and supporting said ejector blade in either of its transposed reversed positions whereby said blade may be operated to effect ejection of the cuttings from said chamber irrespective of the direction of operation of the mechanism.

4. The combination with a coal cutting machine having a frame provided with a cuttings receiving passageway, a cutter bar pivotally mounted on said frame to swing horizontally relative thereto about an upright axis, an endless cutter chain guided for orbital circulation about the margin of said cutter bar in said cuttings receiving passageway and a chain sprocket in said passageway in coaxial relation with the bar pivot for driving said cutter chain, of a cuttings ejector mechanism mounted to swing horizontally with said cutter bar relative to said frame about said upright pivotal axis and comprising a cuttings ejector member disposed in said passageway and having horizontal oscillatory movement about an upright axis parallel with said bar pivot axis, said ejector member having a free end remote from its pivotal axis movable in an orbital path in the vicinity of the path of said cutter chain as the latter travels around said chain sprocket, and mounting and driving means for said ejector member for mounting the latter on said frame within said passageway and for driving said ejector member to effect such horizontal oscillatory movement thereof.

5. The combination with a coal cutting machine having a frame provided with a cuttings receiving passageway, a cutter bar pivotally mounted on said frame to swing horizontally relative thereto about an upright axis, an endless cutter chain guided for orbital circulation about the margin of said cutter bar in said cuttings receiving passageway and a chain sprocket in said passageway in coaxial relation with said bar pivot for driving said cutter chain, of a cuttings ejector mechanism mounted on said cutter bar to swing horizontally therewith relative to said frame and comprising a cuttings ejector member disposed in said passageway to move horizontally orbitally about an upright pivotal axis, said ejector member provided with a free end remote from its pivotal axis movable in an orbital path in the vicinity of the path of said cutter chain as the latter travels around said chain sprocket, and mounting and driving means for said ejector member for mounting the latter for horizontal oscillatory movement on said frame and for driving said ejector member, said driving means including connections rotatable at the same angular speed as and rotating with said chain sprocket and engaging said ejector member to effect oscillation of the latter as said chain sprocket is driven.

6. The combination with a coal cutting machine having a frame provided with a cuttings receiving chamber, a cutter bar secured to said frame and projecting into said chamber, an endless cutter chain guided for orbital circulation about the margin of said bar and a chain sprocket arranged within said chamber for driving said cutter chain, of a slack ejector mechanism carried by said frame and disposed with respect to the cutter chain for moving the cuttings discharged from the cutter chain as the latter passes around said chain sprocket and for ejecting the cuttings rearwardly from said chamber comprising a horizontal arm disposed in said chamber beneath said chain sprocket, means for mounting said arm on said frame for lateral oscillatory movement and for back and forth bodily movements and for guiding said arm during such bodily movements, an ejector plate pivotally connected to the free end of said arm, means for guiding said ejector plate for orbital movement in said chamber in the vicinity of said cutter chain, and means rotatable at the same angular speed as said chain sprocket for actuating said arm.

7. The combination with a coal cutting machine having a frame provided with a horizontal chamber for receiving slack coal, a cutter bar secured to said frame and extending within said chamber, an endless cutter chain guided for orbital circulation about the margin of said bar and driving means for said cutter chain, of a slack ejector mechanism carried by said frame within said chamber for ejecting slack coal therefrom and including a horizontal arm disposed near the bottom of said chamber and extending generally lengthwise of said chamber, said arm having a free rear end, an oscillatory bearing element journaled within said frame on an upright axis for slidingly receiving and supporting the forward portion of said arm, the axis of said bearing element lying within the orbit of said cutter chain midway between the sides of said frame, a crank element rotatable about a vertical axis within said frame and driven by said chain driving means, said crank element having a crank engaging said arm for moving the free rear end of said arm to an orbital path in the vicinity of said cutter chain, and an ejector plate connected to the free rear end of said arm for orbital movement therewith.

8. The combination with a kerf cutting mechanism having a frame carrying a cutter bar on which an endless cutter chain is guided for orbital circulation and provided with a horizontal chamber within which said cutter chain moves and a chain sprocket with said chamber for driving said cutter chain, a horizontal arm extending longitudinally along the bottom of said chamber beneath said sprocket and having a projecting guide portion and an opposite free outer end, a swiveled guide rotatable about a vertical axis lying in the longitudinal median line of said bar and with which said guide portion has guided engagement, a crank rotatable at the same angular speed as said chain sprocket and rotating with said sprocket, said crank engaging said arm intermediate its ends for oscillating the latter horizontally over the chamber bottom about an upright pivotal axis to move said opposite free end of said arm remote from its pivotal axis in an orbital path, and a cuttings ejector element connected to said free end of said arm to move in an orbital path close to the path of said cutter chain whereby the cuttings are engaged thereby and ejected outwardly from said chamber.

9. The combination as set forth in claim 8 wherein said cuttings ejector element is pivotally connected to said free end of said arm and extends transversely of said chamber, and guiding means is provided at one side of said frame for guiding said cuttings ejecting element, said guiding means including means for guiding said element for oscillatory and axial sliding movements.

10. The combination as set forth in claim 9 wherein said chain sprocket is reversible thereby to cause reverse operation of said arm, and said cuttings ejecting element is transposable and transposable in reverse positions with respect to said arm and to said frame, and guiding means is provided at the opposite side of said frame for guiding said element for oscillatory and axial movements when in its transposed reversed position.

11. The combination with a reversible cutting mechanism including a frame provided with a cuttings receiving chamber and a cutter bar having its rearward portion located in said chamber and about which an endless cutter chain is guided for orbital circulation and a reversible chain sprocket for driving said chain in either of opposite directions, of a reversible cuttings ejector mechanism comprising a reversible actuating arm arranged at the bottom of said chamber and extending beneath said sprocket, said arm having a free outer end, a crank projecting below and rotatable at the same angular speed as and rotating with said sprocket for actuating said arm to cause said free end to trace an orbital path, and a transposable cuttings ejecting element disposable in reversed positions with respect to said arm in connection with the free end of the latter for actuation by said arm in either of its transposed positions whereby the cuttings may be ejected from said chamber irrespective of the direction of operation of the ejector mechanism.

12. A slack ejector mechanism adapted for association with a coal cutting machine of the type having an endless cutter chain driven by a chain sprocket, comprising a casing having a horizontal chamber for receiving slack coal discharged from the machine, a member arranged in said chamber and extending longitudinally along the bottom thereof beneath said sprocket, said member mounted for horizontal angular movement about an upright pivotal axis and for bodily reciprocatory movement, said member having a free oscillatory end disposed remote from said pivotal axis, means connected to said member for reciprocating and angularly moving the same to cause said free outer end of said member to trace an orbital path, and an upright ejector plate connected to said free outer end of said member and movable upon reciprocatory and angular movements of the latter to effect rearward movement and ejection of the slack coal from said chamber, said means for reciprocating and angularly moving said member comprising a crank connected to and extending downwardly from said sprocket into engagement with said member, said member having a vertical opening therein intermediate the ends thereof for receiving said crank whereby the ejector mechanism is driven by the coal cutting machine.

References Cited in the file of this patent

UNITED STATES PATENTS

| | | |
|---|---|---|
| 1,306,064 | Joy | June 10, 1919 |
| 1,467,700 | Wilson | Sept. 11, 1923 |
| 1,616,597 | Pray | Feb. 8, 1927 |
| 1,656,616 | Wilson | Jan. 17, 1928 |
| 1,942,798 | Bosworth | Jan. 9, 1934 |
| 2,302,461 | Richards | Nov. 17, 1942 |
| 2,359,422 | Jeffrey | Oct. 3, 1944 |
| 2,448,057 | Simmons | Aug. 31, 1948 |
| 2,499,872 | Osgood | Mar. 7, 1950 |

FOREIGN PATENTS

| | | |
|---|---|---|
| 695,737 | Germany | Aug. 31, 1940 |
| 381,022 | Great Britain | Sept. 29, 1932 |
| 503,338 | Great Britain | Apr. 4, 1939 |
| 577,298 | Great Britain | May 13, 1946 |